April 17, 1951  E. J. FARKAS  2,549,073
CONTROL FOR AUTOMATIC TRANSMISSIONS
Filed Nov. 14, 1945  3 Sheets-Sheet 1

E. J. FARKAS
INVENTOR.

BY Edwin C. McRae
R. G. Harris
John R. Faulkner
ATTORNEYS

April 17, 1951      E. J. FARKAS      2,549,073

CONTROL FOR AUTOMATIC TRANSMISSIONS

Filed Nov. 14, 1945      3 Sheets-Sheet 2

E. J. FARKAS
INVENTOR.

BY

ATTORNEYS

E. J. FARKAS
INVENTOR.

BY Edwin C. McRae
R. G. Harris
John R. Faulkner
ATTORNEYS

Patented Apr. 17, 1951

2,549,073

UNITED STATES PATENT OFFICE 2,549,073

CONTROL FOR AUTOMATIC TRANSMISSIONS

Eugene J. Farkas, Detroit, Mich., assignor to Ford Motor Company, Dearborn, Mich., a corporation of Delaware Application November 14, 1945, Serial No. 628,436

7 Claims. (Cl. 74—752)

This invention relates generally to a transmission; and more particularly to a manually operated deceleration control for an automatic transmission by means of which the vehicle engine can be utilized to retard the vehicle speed.

The present invention comprises an improvement of the automatic transmission disclosed in the copending application of Eugene J. Farkas, Serial No. 611,975, filed August 22, 1945, now Patent #2,528,584, November 7, 1950. The transmission of the said copending application includes a multiple planetary gearing system adapted to transmit torque at three different speed ratios, with the transmission from first to second speed, and from second to third speed, taking place automatically by the operation of second and third speed clutches which are activated by fluid under pressure supplied by a fluid pump and regulated by governor-controlled hydraulic valve means. In this construction, a selectively operated overrunning clutch was located between the planet carrier and the housing, and served to prevent reverse rotation of the planet carrier, enabling the planetary gearing system to transmit torque at several different speed ratios in the forward direction.

The traffic laws of a number of States require that vehicles be equipped to permit the vehicle engine, operating through an intermediate or second speed ratio in the transmission, to retard the vehicle speed during downhill operation. This is necessary from a safety standpoint as continued downhill operation places too great a strain upon the ordinary braking system of a vehicle. With an automatic transmission of the type disclosed in the said copending application, two problems are presented in obtaining engine deceleration control in second speed. First, means must be provided for manually effecting a shift from third to second speed ratio, since, during downhill operation, the vehicle speed will likely be greater than that at which the transmission is automatically shifted down to second speed. Second, means must be provided to prevent the transmission load shaft from overrunning the power shaft, which would normally occur in downhill operation with a transmission of the type disclosed, due to the overrunning clutch between the planet carrier and the transmission housing.

It is therefore an object of the present invention to equip an automatic transmission with means permitting the vehicle engine to be used in second speed to retard the vehicle speed.

Another object of the invention is to provide an automatic transmission in which a single manually operated control is arranged to effect a transition to a lower speed ratio and to simultaneously prevent the transmission load shaft from overrunning the power shaft during downhill operation by providing a positive connection between the power and load shafts so that the vehicle engine can be used for braking.

A further object is to provide a deceleration control for an automatic transmission of the planetary type in which a hydraulic valve is manually operated to interrupt the flow of fluid under pressure to a third speed actuating clutch to shift the transmission from third to second speed; and in which another hydraulic valve is simultaneously operated to supply fluid under pressure to a hydraulic cylinder and piston to actuate a brake locking the planet carrier against rotation in either direction and thus maintaining a positive connection between the vehicle engine and the load shaft in second speed ratio to provide engine braking during downhill operation.

It is also a feature of this construction to provide an interlocking arrangement between the planet carrier brake drum and the planet pinion shafts mounted in the carrier.

Other objects and advantages of the present invention will be made more apparent as this description proceeds, particularly when considered in connection with the accompanied drawing, in which.

Figure 1:
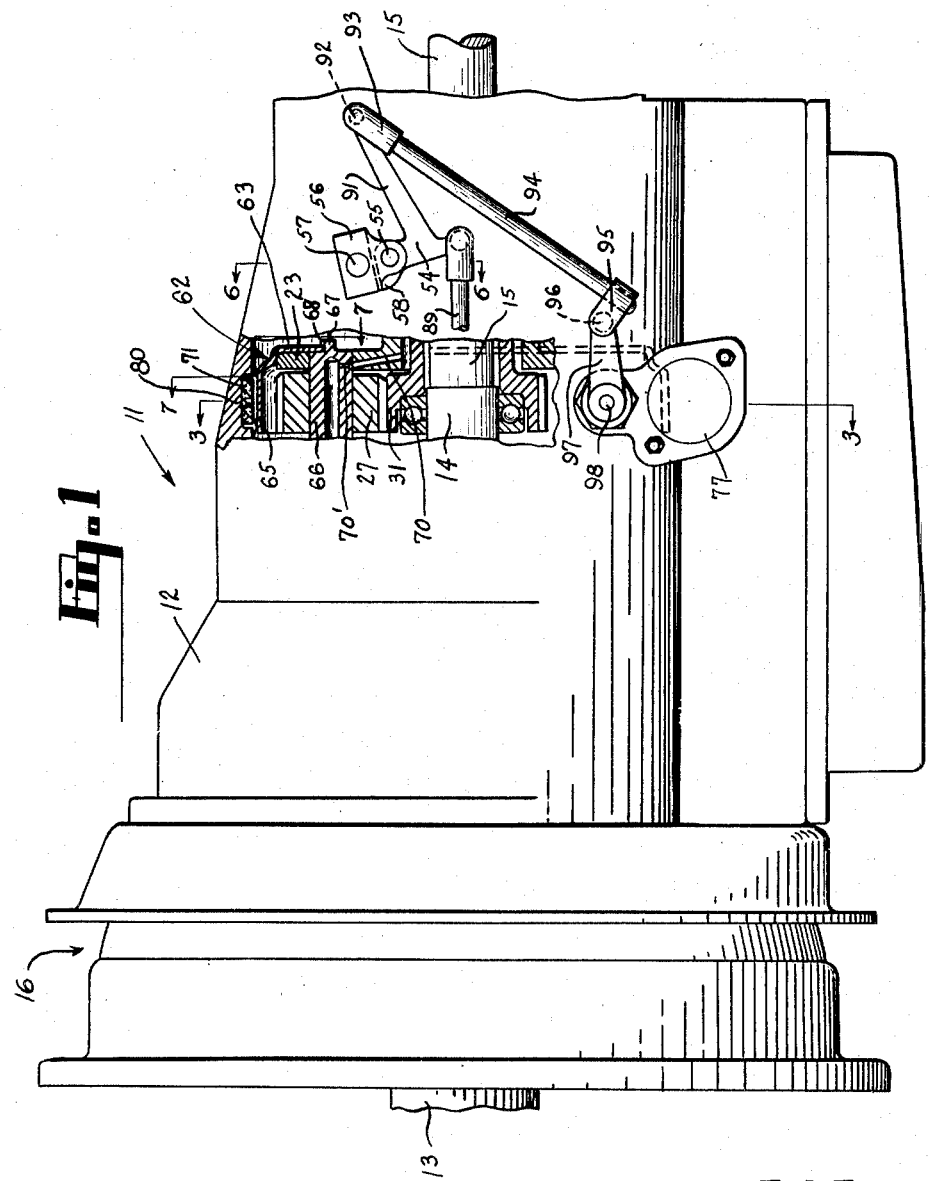
Figure 1 is a side elevation, partly broken away and in section, of an automatic transmission embodying the present invention.
Figure 6:
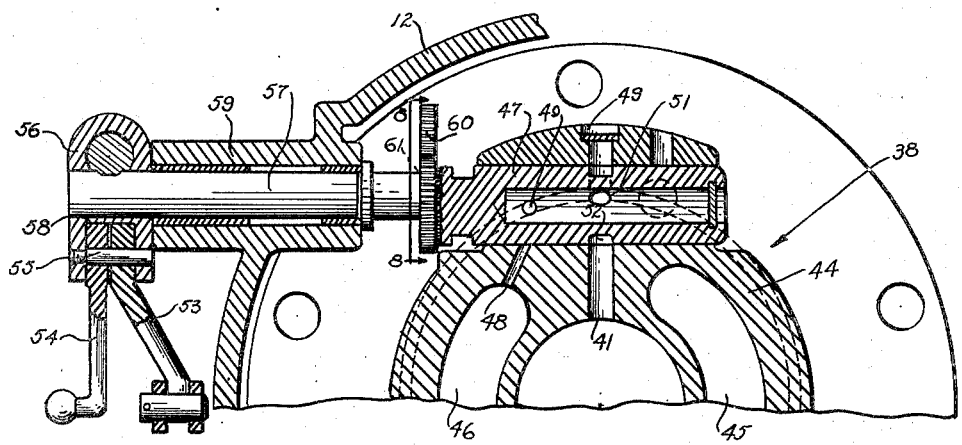
Figure 7:
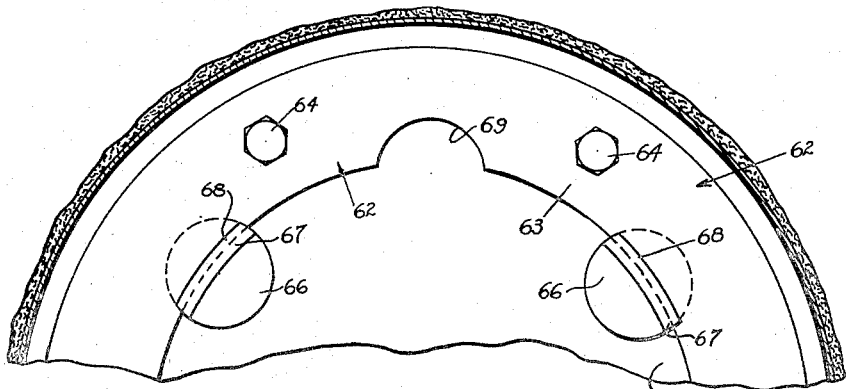

Figures 6 and 7 are cross-sectional views taken on the lines 6—6 and 7—7, respectively, of Figure 1.

Figure 8:
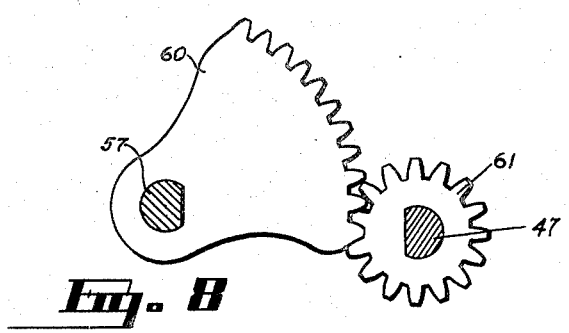

Figure 8 is a cross-sectional view taken on the line 8—8 of Figure 6.

Figure 2:
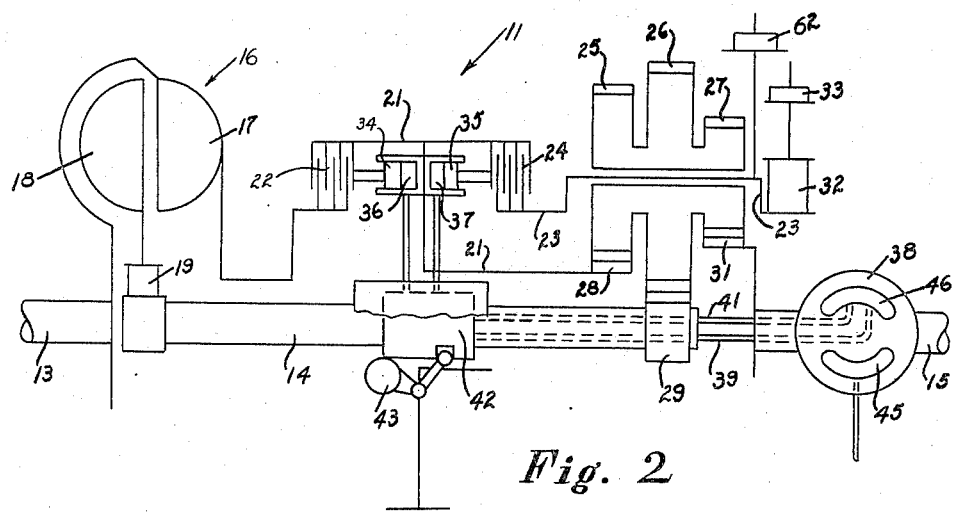
Figure 2 is a longitudinal, vertical schematic drawing of the transmission, illustrating the power flow therethrough.

It will be noted that the general construction of the automatic transmission is shown schematically in Figure 2 of the drawing, reference being made to the above mentioned copending application for a more detailed description and illustration of the mechanism.

Referring now to the drawings, and particularly to Figures 1 and 2, the reference character 11 indicates generally an automatic transmission housed within a casing 12, and having a drive shaft 13 connected to the engine crankshaft, a main shaft 14, and a load shaft 15 adapted to be connected to the rear axle drive means of the vehicle. The transmission includes a fluid coupling 16 having an impeller 17 driven by the drive shaft 13, and a runner 18 connected to the main shaft 14 through an over-running clutch 19.

The impeller 17 of the fluid clutch is adapted to be operatively connected to a clutch carrier 21 by means of a second speed clutch 22. The clutch carrier 21 is also adapted to be locked to a planet carrier 23 by means of a third speed clutch 24. The second and third speed clutches are adapted to be actuated automatically by hydraulic mechanism to be described later.

The planet carrier 23 is mounted for rotation about the axis of the main shaft 14 and carries clusters of planet pinions 25, 26 and 27. Planet pinions 25 mesh with the sun gear 28 carried by the clutch carrier 21. Planet pinions 26 mesh with a sun gear 29 mounted on the mainshaft 14, and planet pinions 27 mesh with sun gear 31, the latter being carried by the load shaft 15. In order to transmit torque through the multiple planetary gearing system in the forward direction, an overruning clutch 32 is connected to the planet carrier 23. The overruning clutch can be selectively connected to the transmission casing by means of a forward speed brake 33, thus preventing reverse rotation of the planet carrier.

The second and third speed clutches 22 and 24 are actuated by pistons 34 and 35 housed within cylinders 36 and 37 respectively. Fluid under pressure for operating the second and third speed clutches is supplied from a fluid pump 38 driven by the loadshaft 15 and transmitted through conduits 39 and 41 respectively.

The flow of fluid through conduits 39 and 41 is controlled by a hydraulic valve 42, the position of which is regulated by a centrifugal governor 43 mounted on the clutch carrier 21. In low speed, the governor controlled valve 42 blocks the flow of fluid through conduits 39 and 41 and, accordingly, neither the second or third speed clutch is operated. Power is then transmitted from the drive shaft 13 through the fluid coupling 16 to the main shaft 14, and then through sun gear 29, planet pinions 26 and 27, and sun gear 31 to the load shaft 15, driving the latter in the forward direction at low or first speed.

The transmission is automatically shifted to second speed as the rotational speed of the clutch carrier 21 increases with an increase in the speed of the load shaft 14. The increase in speed results in radial displacement of the centrifugal governor 43 and axial displacement of the hydraulic valve 42, opening conduit 39 and admitting fluid under pressure to the second speed clutch cylinder 36. Actuation of the second speed clutch 22 by piston 34 is effective to lock the drive shaft 13 and the impeller 17 of the fluid coupling to the clutch carrier 21. The clutch carrier drives sun gear 28 carried thereby and, through planet pinions 25 and 27 and sun gear 31, is effective to rotate the load shaft 15 at an intermediate or second speed ratio.

When the rotational speed of the clutch carrier 21 has increased a further predetermined amount, the governor controlled hydraulic valve 42 is shifted to a position establishing fluid communication through conduit 41 to the third speed clutch cylinder 37. Piston 35 in the cylinder actuates the third speed clutch 24 and results in the rotation as a unit of the clutch carrier, planet carrier, and triple planetary pinion. Accordingly, a direct drive is established from the drive shaft 13 to the load shaft 15, transmitting torque at engine speed in the forward direction.

It will be apparent from the foregoing description that the second and third speed clutches 22 and 24 are automatically operated by fluid pressure supplied from the pump 38, and effect an automatic transition between first, second and third speeds.

Attention is now directed to Figure 6 in which the fluid pump 38 is shown in section, and comprises a pump housing 44 carried at the rearward end of the transmission casing 12, and having an intake chamber 45 connected to the transmission sump and a pressure chamber 46. Mounted in the pump housing 44 and arranged to control the flow of fluid to the third speed conduit 41 is a rotary valve 47. During normal operating conditions, the rotary valve 47 is so positioned as to establish communication between the pressure passage 48 leading from the pressure chamber 46 and the third speed conduit 41 through the port 49, the axial bore 51, and the annular groove 52.

The rotary valve 47 is arranged to be rotated by the operation of either one of a pair of control arms 53 and 54. The control arms 53 and 54 are pivotally mounted upon a pin 55 carried by a collar 56 secured to the control rod 57. It will be noted from Figures 1 and 6 that each of the control arms is provided with a cam surface 58 arranged to engage the collar 56, so that operation of either one of the control arms rotates the control rod 57 without affecting the position of the other control arm. Control rod 57 is journaled in a boss 59, and carries at its inner end a quadrant or sector 60, the teeth of which mesh with the teeth of a pinion 61 carried by the rotary valve 47.

The control arm 53 is connected to the vehicle accelerator to provide a manual control of the transmission in the event additional acceleration is desired beyond that available in the particular speed ratio in which the transmission is then operating. Control arm 54 is connected by suitable linkage (not shown) to a control button on the dash of the vehicle. Operation of this dash button is effective, as described hereinafter, to shift the transmission from third to second speed and also to prevent overrunning of the load shaft, thus providing the necessary downhill deceleration control.

When the rotary valve 47 is rotated by control arm 54 to the position shown in Figure 6, the body of the valve closes pressure passage 48 leading from the pressure chamber 46 of the pump, and thus cuts off the flow of fluid to the cylinder 37 for the third speed clutch 24. This renders the third speed clutch inoperative and releases the clutch carrier 21 from locking engagement with the planet carrier 23, resulting in shifting the transmission from third to second speed. During normal operation the vehicle engine drives the vehicle through the overrunning clutch 32. When operating downhill, however, as is frequently necessary in travel over mountainous territory, gravity urges the vehicle downhill at a speed such that the load shaft 15 overruns the drive shaft 13, through the overrunning clutch 32 and the multiple planetary gear set. Under these conditions the engine of the vehicle is not available to retard the vehicle speed, and the vehicle brakes must be relied upon entirely. It is therefore necessary, in a transmission of this type, to provide means preventing the overrunning of the load shaft in addition to providing means for shifting the transmission from third to second speed.

Referring now particularly to Figures 1, 3 and 7, 62 is a brake drum having a radial flange 63 secured to the planet carrier 23 by means of bolts 64, and an axially extending braking flange 65. As best seen in Figure 7, the shafts 66 for the planet pinions are each provided at one end with an arcuate flange 67 concentric with the axis of the main shaft 14 about which the planet carrier 23 revolves. The arcuate flange 67 terminates in a radially outwardly extending lip 68 which overlaps the radially inner edge of the flange 63 of the brake drum. A plurality of semi-circular openings 69 are provided in the radial flange 63 of the brake drum, being spaced from each other and corresponding in number to the planet pinion shafts 66. To assemble the brake drum to the planet carrier 23, the semi-circular openings 69 in the brake drum are aligned with the shafts 66, permitting the brake drum to be moved axially into engagement with the flange of the planet carrier, after which the brake drum is rotated to the position shown in Figure 7 in which the drum flange 63 and the flanges 67 and lips 68 of the shafts are in interlocking engagement. Inadvertent rotation of each shaft 66 is thus prevented, and the lubrication passages 70 and 70' in the planet carrier 23 and the shaft 66, respectively, are maintained in registration.

Surrounding the braking flange 65 of the drum is a brake band 71 of suitable friction material. One end of the brake band 71 has secured thereto an anchor 72 (Figure 3) engaging a shoulder 73 on the transmission casing 12. Secured to the opposite end of the brake band is a bracket 74 having a spherical recess therein for receiving the piston rod 75 of an actuating piston 76. Piston 76 is reciprocable within a cylinder 77 removably mounted within the transmission casing. A coil spring 78 moves the piston and brake band to an inoperative position, the brake band being received within an annular groove 80 formed on the inner surface of the transmission casing 12.

Figure 3:
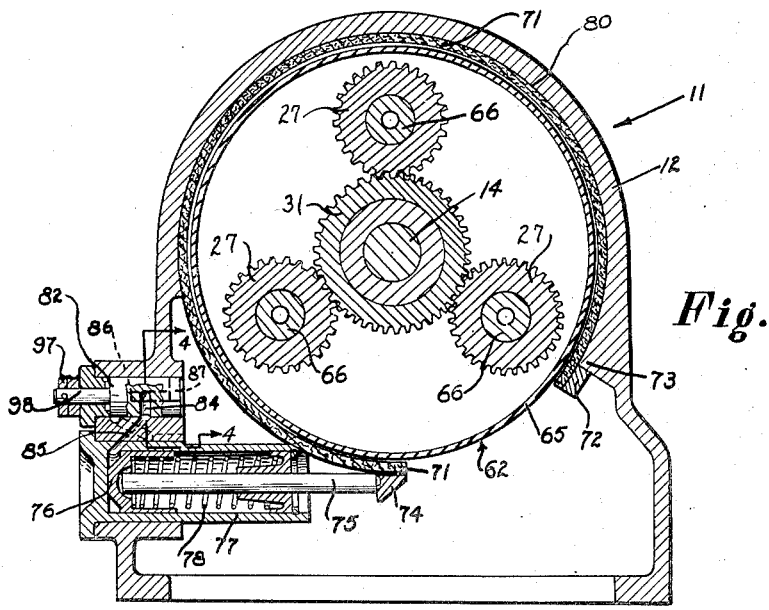
Figure 3 is a cross-sectional view taken on the line 3—3 of Figure 1.
Figures 4, 5:
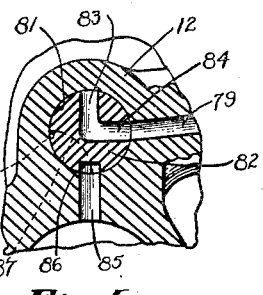
Figure 4 is a cross-sectional view taken on the line 4—4 of Figure 3.
Figure 5 is a cross-sectional view similar to Figure 4, but illustrating the valve in another position.

Fluid under pressure for actuating the piston 76 and applying the brake band to the drum is furnished by the pump 38 and transmitted through a passage 79 formed in the transmission casing. As best seen in Figures 3, 4 and 5, passage 79 communicates with a bore 81 formed in the transmission casing and housing a rotary valve 82. Valve 82 is provided with a pair of radial passages 83 and 84 intersecting each other at right angles. In the position of the valve shown in Figure 4, passages 83 and 84 establish communication between the pressure passage 79 from the pump and passage 85 leading to the brake actuating cylinder 77. The resulting movement of piston 76 clamps the brake band 71 around the braking flange 65 of the brake drum and locks the planet carrier 23 to the transmission casing. It will be seen that with the planet carrier locked in stationary position, the overrunning clutch 32 is overruled, and both forward and reverse rotation of the planet carrier are prevented. With the transmission in second speed, and the planet carrier 23 locked, a positive driving connection is provided between the power shaft 13 and the load shaft 15. Increased downhill acceleration of the vehicle is thus retarded by the compression in the vehicle engine which serves as an effective braking means, obviating the necessity of continued use of the conventional vehicle brake.

In the position shown in Figure 5, the rotary valve 82 has been rotated in a counterclockwise direction through an angle of 90°, to a position in which the flow of fluid to the brake cylinder 77 through the passage 85 is blocked. A longitudinally extending groove 86 is now aligned with passage 85 leading to the brake cylinder and provides a passage through which fluid in the brake cylinder can be returned to the interior of the transmission casing when the brake piston 76 is retracted by the spring 78. The outer end of the rotary valve 82 is provided with an arcuate groove 87 traversing an angle of 90° and engageable with a suitable stop 88 in the bore 81 to limit the angular movement of the valve to 90°.

The rotary valve 82, controlling the flow of fluid to the brake cylinder 77, is arranged to be operated simultaneously with the rotary valve 47 which is operative to shift the transmission from third to second speed. As best shown in Figure 1, the lower end of control arm 54 is connected by means of a rod 89 to the control button (not shown) mounted on the vehicle dash. Control arm 54 is formed in the shape of a bellcrank having a rearwardly extending arm 91 terminating in a ball joint 92, the latter being universally received within a socket provided in the connection 93 carried at the upper end of the link 94. The lower end of link 94 has secured thereto a clip 95 containing a socket universally receiving the ball joint 96 formed in the outer extremity of the actuating arm 97, which in turn is secured to the shaft 98 extending from the rotary valve 82. It will now be apparent that movement of the rod 89 is effective through the above described linkage to simultaneously rotate the two valves 47 and 82. Thus, valve 47 is rotated to shift the transmission from third to second speed, as previously described, and valve 82 is simultaneously rotated to apply brake band 71 to the brake drum 62, locking the planet carrier 23 and providing a direct connection between the vehicle engine and the vehicle wheels to obtain the retarding effect of the engine in second speed during downhill operation. The release of the dash control to its normal position returns valves 47 and 82 to their original positions, and enables the transmission to be operated in a fully automatic manner for normal driving conditions. The present invention thus provides an economically manufactured construction which is easily operated by means of a single control to provide the required deceleration for downhill operation of the vehicle.

It will be understood that the invention is not to be limited to the exact construction shown and described, but that various changes and modications may be made without departing from the spirit and scope of the invention, as defined in the appended claims.

What is claimed is:

1. In a variable speed power transmission, in combination, a power shaft, an intermediate shaft, a load shaft, power transmitting means for driving said intermediate shaft from said power shaft, a multiple planetary gearing system between said intermediate and load shafts comprising planet pinions mounted on a planet carrier rotatably supported about the axis of the intermediate shaft and respectively meshing sun gears, a fluid pressure operated clutch associated with said multiple planetary gearing system automatically supplied with fluid pressure under predetermined conditions of speed to change from one speed ratio to a higher speed ratio, valve means operable to cut off the supply of fluid to said clutch to change from said higher speed ratio to said lower speed ratio, a brake for locking said planet carrier against rotation in either direction to provide a positive connection between said power and load shafts in said lower speed ratio, hydraulic power means for applying said brake, a valve controlling said hydraulic power means, and a manually operable control having positive connections to said first and second valve means to simultaneously operate said two valve means.

2. In a variable speed power transmission, in combination, a power shaft, an intermediate shaft, a load shaft, power transmitting means for driving said intermediate shaft from said power shaft, a multiple planetary gearing system between said intermediate and load shafts comprising planet pinions mounted on a planet carrier rotatably supported about the axis of the intermediate shaft and respectively meshing sun gears, a fluid pressure operated clutch associated with said multiple planetary gearing system automatically supplied with fluid pressure under predetermined conditions of speed to change from one speed ratio to a higher speed ratio, valve means operable to cut off the supply of fluid to said clutch to change from said higher speed ratio to said lower speed ratio, a brake drum carried by said planet carrier, brake friction means adjacent said drum, a cylinder and piston for applying said friction means, valve means controlling the flow of fluid to said cylinder, linkage positively connected to said first and second valve means to compel simultaneous operation of said two valve means, and manually operable control means positively connected to said linkage to operate said two valve means.

3. In a variable speed power transmission, in combination, a housing, a power shaft, a load shaft, a multiple planetary gearing system comprising a carrier and planet pinions and sun gears having one element thereof fixed for rotation with said load shaft, a power transmitting member interposed between said power shaft and said planetary gearing system and arranged for selective operation therewith, means to lock said member to said power shaft and said planetary gearing system to effect differential rotation thereof and transmit torque at one speed ratio, means to lock said member to said power shaft and said planetary gearing system to effect common rotation thereof and to transmit torque at a higher speed ratio, hydraulic means for operating said last two locking means, a conduit leading to said hydraulic means, a pump supplying activating fluid under pressure to said conduit, valve means to control the fluid pressure in said conduit, a brake for locking said planet carrier against rotation in either direction, and a single manually operable control for operating said valve to effect a shift to said first mentioned lower speed ratio and to simultaneously operate said brake to prevent said load shaft from overrunning said power shaft.

4. The structure of claim 3 which is further characterized in that said valve and said brake include rotary operating members mounted in said housing at spaced points, and said manually operable control includes linkage interconnecting said rotary operating members to effect simultaneous operation thereof.

5. The structure of claim 3 which is further characterized in that said valve is effective upon a predetermined movement thereof to block the flow of fluid through said conduit and release said second mentioned locking means to shift to the said lower speed ratio, said brake including a brake drum carried by said planet carrier, friction means surrounding said drum, a hydraulic actuating cylinder and piston for said friction means, a conduit leading from said pump to said cylinder, a rotary valve controlling the flow of fluid through said last mentioned conduit, and linkage interconnecting said two valves to effect simultaneous operation thereof.

6. In a variable speed power transmission, in combination, a power shaft, a load shaft, a planetary gearing system interposed between said power and load shafts and including a plurality of planet pinions mounted on a planet carrier, shafts for said pinions carried by said carrier, each of said shafts having a tongue projecting from one end, said tongue being formed with a groove having an arcuate base, an annulus mounted on said carrier having its radially inner edge adapted to fit within the grooves in said pinion shafts, and spaced notches in said annulus large enough to permit said tongues to pass therethrough after which said annulus may be turned to interlock with said grooves.

7. In a variable speed power transmission, in combination, a power shaft, an intermediate shaft, a load shaft, power transmitting means for driving said intermediate shaft from said power shaft, a multiple planetary gearing system between said intermediate and load shafts comprising planet pinions mounted on a planet carrier rotatably supported about the axis of the intermediate shaft and respectively meshing sun gears, fluid pressure actuated clutch means arranged to effect different speed ratios within said gearing system including a clutch adapted to interconnect said planet carrier and one of said sun gears, a pump, a conduit connecting said pump to said last-mentioned clutch, a valve associated with said pump arranged upon predetermined movement to interrupt the flow of fluid to said conduit to release said last-mentioned clutch and effect a change from one speed ratio to a lower speed ratio, a brake for locking said planet carrier against rotation in either direction to provide a positive connection between said power and load shafts in said lower speed ratio, brake actuating means for applying said brake, linkage interconnecting said brake actuating means and said valve to provide for simultaneous operation thereof, and manually operable means connected to said linkage.

EUGENE J. FARKAS.

REFERENCES CITED

The following references are of record in the file of this patent:

UNITED STATES PATENTS

| Number | Name | Date |
|---|---|---|
| 1,943,293 | Banker | Jan. 16, 1934 |
| 1,996,790 | Banker | Apr. 9, 1935 |
| 2,171,534 | Banker | Sept. 5, 1939 |
| 2,193,317 | Flogaus | Mar. 12, 1940 |
| 2,303,975 | Banker | Dec. 1, 1942 |
| 2,332,593 | Nutt et al. | Oct. 26, 1943 |
| 2,368,835 | Hill et al. | Feb. 6, 1945 |
| 2,371,574 | Swennes | Mar. 13, 1945 |
| 2,402,248 | Hale | June 18, 1946 |